US006507319B2

(12) United States Patent
Sikina

(10) Patent No.: US 6,507,319 B2
(45) Date of Patent: Jan. 14, 2003

(54) MECHANICALLY STEERABLE ARRAY ANTENNA

(75) Inventor: Thomas V. Sikina, Acton, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/945,245

(22) Filed: Aug. 31, 2001

(65) Prior Publication Data

US 2002/0075194 A1 Jun. 20, 2002

Related U.S. Application Data

(60) Provisional application No. 60/229,591, filed on Aug. 31, 2000.

(51) Int. Cl.[7] .................................................. H04B 7/00
(52) U.S. Cl. ....................................... 343/757; 342/367
(58) Field of Search ................................ 343/757, 754, 343/753, 783, 772, 776, 785; 342/367

(56) References Cited

U.S. PATENT DOCUMENTS

| | | | | |
|---|---|---|---|---|
| 3,918,064 A | | 11/1975 | Gustincic | 343/783 |
| 4,469,165 A | | 9/1984 | Ungarean et al. | 164/467 |
| 5,196,812 A | | 3/1993 | Drost et al. | 333/113 |
| 5,266,961 A | | 11/1993 | Milroy | 343/772 |
| 5,349,363 A | | 9/1994 | Milroy | 343/772 |
| 5,361,076 A | | 11/1994 | Milroy | 343/772 |
| 5,412,394 A | | 5/1995 | Milroy | 343/785 |
| 5,483,248 A | | 1/1996 | Milroy | 343/785 |
| 5,583,524 A | | 12/1996 | Milroy | 343/772 |
| 5,719,975 A | | 2/1998 | Wolfson et al. | 385/48 |
| 5,781,087 A | | 7/1998 | Milroy et al. | 333/257 |
| 5,905,472 A | | 5/1999 | Wolfson et al. | 343/772 |
| 5,926,077 A | | 7/1999 | Milroy | 333/125 |
| 5,945,946 A | * | 8/1999 | Munger | 342/367 |
| 5,995,055 A | | 11/1999 | Milroy | 343/772 |
| 6,075,494 A | | 7/2000 | Milroy | 343/776 |
| 6,101,705 A | | 8/2000 | Wolfson et al. | 29/600 |

OTHER PUBLICATIONS

PCT International Search Report; International Application No. PCT/US01/41967; International Filing Date Aug. 31, 2001.

Rausch, E.O., Peterson, A.F. and Wiebach, W.; "Electronically Scanned Millimeter Wave Antenna Using A Rogman Lens"; Radar 97, Oct. 14–16, 1997, Publication No. 449; IEE 1997; pp. 374–378.

* cited by examiner

*Primary Examiner*—Don Wong
*Assistant Examiner*—James Clinger
(74) *Attorney, Agent, or Firm*—Daly, Crowley & Mofford, LLP

(57) ABSTRACT

An antenna includes a lower plate assembly having at least one antenna port and including a beamformer which provides a uniform excitation on the first surface of the lower plate assembly in response to a signal fed to the at least one antenna port and an upper plate having a radiating aperture, the upper plate movably disposed on the first surface of the lower plate assembly to couple energy from the beamformer in the lower plate assembly to a plurality of radiating elements, wherein the position of the upper plate relative to the lower plate determines a scan angle of the antenna.

11 Claims, 8 Drawing Sheets

MECHANICALLY STEERABLE ARRAY ANTENNA

CROSS-REFERENCE TO RELATED APPLICATIONS

This application claims the benefit of U.S. Provisional Application No. 60/229,591, filed on Aug. 31, 2000 which application is hereby incorporated herein by reference in its entirely.

STATEMENTS REGARDING FEDERALLY SPONSORED RESEARCH

Not applicable.

FIELD OF THE INVENTION

This invention relates to radio frequency (RF) antennas and more particularly to a mechanically steerable RF array antenna.

BACKGROUND OF THE INVENTION

As is known in the art, satellite communication systems include a satellite which includes a satellite transmitter and a satellite receiver through which the satellite transmits signals to and receives signals from other communication platforms. The communication platforms in communication with the satellite are often located on the surface of the earth or, in the case of airborne platforms, some distance above the surface of the earth. Communication platforms with which satellites communicate can be provided, for example, as so-called ground terminals, airborne stations (e.g. airplane or helicopter terminals) or movable ground based stations (sometimes referred to as mobile communication systems). All of these platforms will be referred to herein as ground-based platforms.

To enable the transmission of radio frequency (RF) signals between the satellite and the ground-based platforms, the ground-based platforms utilize a receive antenna which receives signals from the satellite, for example, and couples the received signals to a receiver circuit in the ground-based platform. The ground-based platforms can also include a transmitter coupled to a transmit antenna. The transmitter generates RF signals which are fed to the transmit antenna and subsequently emitted toward the satellite communication system. The transmit and receive antennas used in the ground-based platforms must thus be capable of providing a communication path between the transmitter and receiver of the ground-based platform and the transmitter and receiver of the satellite.

To establish communication between one or more satellites and the ground-based platform, the antenna on the ground-based platform must be capable of scanning the antenna beam to first locate and then follow the satellite. One type of antenna capable of scanning the antenna beam is an electronically steerable phased array (ESA) antenna. One problem with ESA antennas, however, is that they are relatively large and expensive. Thus ESA antennas are not typically appropriate for use with those ground-based platforms which are frequently moved from one location to another.

Furthermore, although ESA anteinas can rapidly change the position of the antenna beam, such antennas still provide only a single antenna beam at any instant in time. Thus, ESA antennas only allow communication with one satellite at a time. Stated differently, ESA antennas only allow sequential communication with satellites.

Sequential operation is used in communication systems having a so-called "break-before-make" capability. In this type of communication system, a ground-based platform "breaks" communication with a satellite prior to establishing communication with another satellite. Such communication systems can utilize a single beam antenna system (e.g. an ESA antenna) which can acquire each satellite system sequentially.

Some communication systems, however, require a so-called "make-before-break" capability. In make-before-break communication systems, a ground-based platform does not break communication with a satellite until it has already established communications with another satellite. To communicate with multiple satellites simultaneously, the ground-based platform must have an antenna system which simultaneously provides multiple antenna beams. Since ESA antennas can only provide a single beam, in order to provide two beams, it is necessary for the ground-based plant form to utilize two ESA antennas. Thus, communication systems which utilize ESA antennas and which have a make-before-break capability can be prohibitively expensive.

Some prior art ground-based platforms utilize frequency scanning antennas. In a frequency scanning antenna, the antenna beam position (also referred to as the antenna scan angle) changes as the operating frequency of the antenna changes. Since the position of any single satellite is relatively constant, once a communication path is established between the satellite antenna and the ground-based platform antenna, changing the scan angle of the ground-based platform antenna can result in the loss of the established communication path. Thus, it is generally not desirable for the scan angle to change once a communication path is established.

To prevent the scan angle from changing, frequency scanning antennas must operate over a relatively narrow band of frequencies. Different communications systems, however, operate at different frequencies spread across a relatively wide frequency range (e.g. the K and Ka band frequency ranges). Since frequency scanning antennas only operate over a relatively narrow band of frequencies, such antennas are typically compatible with only a single satellite communication system (i.e. a single system which operates over a relatively narrow band of frequencies). Thus, it is typically necessary to provide a different antenna with each different ground-based platform operating with different satellite communication systems.

It would, therefore, be desirable to provide a reliable antenna which is relatively low cost and compact compared with the cost and size of an ESA antenna. It would be further desirable to provide an antenna which can be used with a ground terminal, in an airborne station such as an airplane or a helicopter, on a mobile ground vehicle such as a HUMV. It would be still further desirable to provide an antenna which operates over a relatively wide frequency range while providing an antenna beam which is steerable over the entire frequency range such that the antenna is compatible with many different satellite communication systems each of which operates at a different frequency in the operating frequency range of the antenna.

SUMMARY OF THE INVENTION

In accordance with the present invention, an antenna includes a lower plate assembly for providing a feed signal on a first surface thereof in response to an input signal provided to an antenna port thereof and an upper plate assembly having a feed circuit coupled to a plurality of radiating elements which define a radiating aperture. The upper plate assembly is rotatably disposed on the first surface of the lower plate assembly such that the feed circuit couples energy between the lower plate assembly and the plurality of radiating elements. A position of the feed circuit on the upper plate assembly relative to the lower plate assembly determines a scan angle of the antenna. With this particular arrangement, an antenna capable of scanning its antenna beam by changing the angle between the feed circuit on the upper plate assembly and the lower plate assembly is provided. The lower and upper plate assemblies can be provided from parallel plate waveguides. The waveguides in each of the lower and upper plate assemblies are aligned and the feed circuit in the upper plate assembly can be provided as a line coupler (e.g. a slot) which couples energy between the parallel plate waveguide transmission line and a corporate feed. The angle at which the line coupler intercepts feed signals on the lower plate assembly determines the antenna scan angle in the elevation plane. Thus, changing the angle at which the line coupler intercepts feed signals on the lower plate assembly changes the antenna scan angle in the elevation plane.

BRIEF DESCRIPTION OF THE DRAWINGS

The foregoing features of this invention, as well as the invention itself, may be more fully understood from the following description of the drawings in which.

The foregoing features of this invention as well as the invention itself may be more fully understood from the following description of the drawings in which.

DETAILED DESCRIPTION OF THE INVENTION

Figure 1:
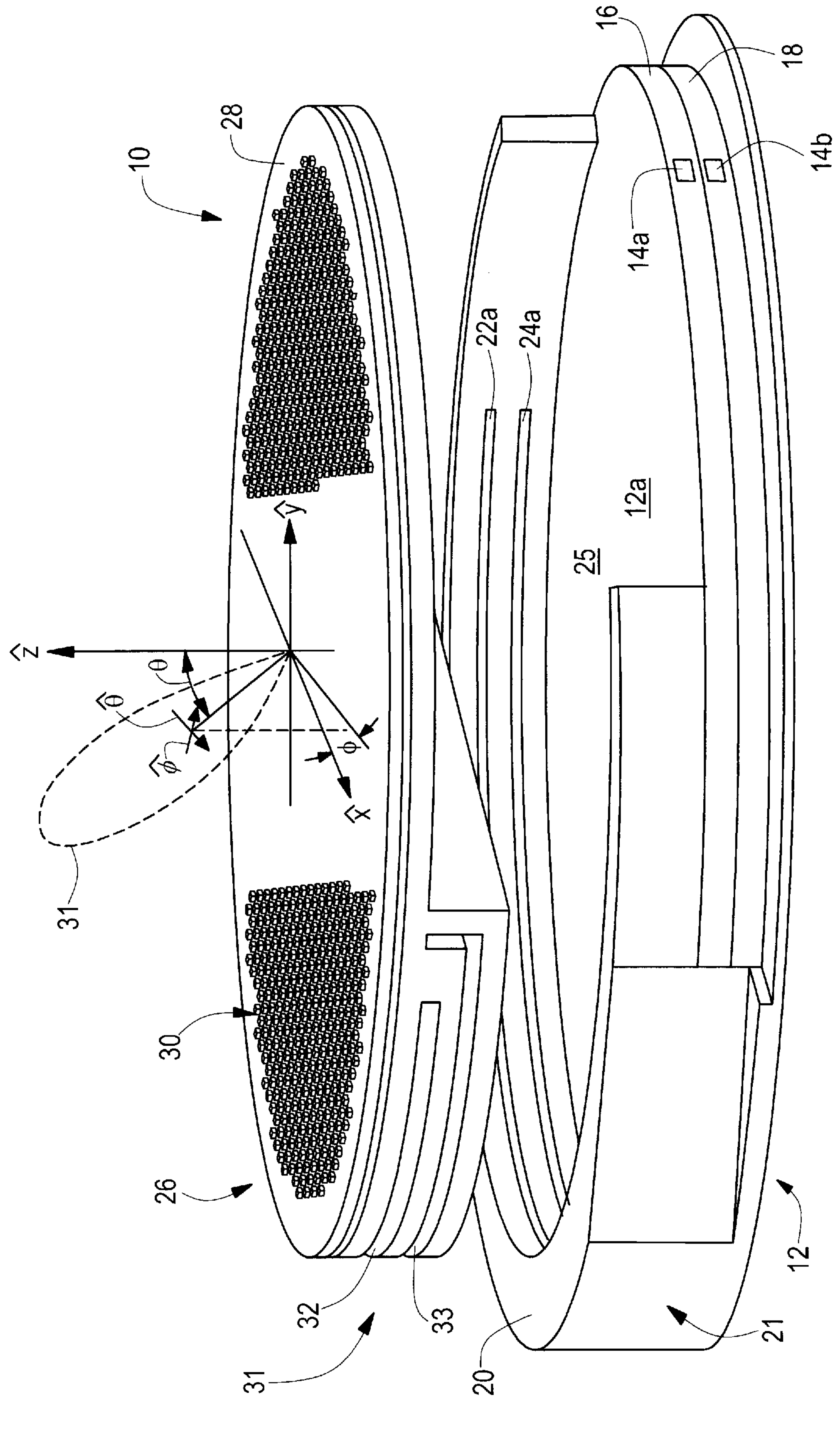
FIG. 1 is a partially exploded perspective view of a mechanically steerable frequency independent array antenna.

Referring now to FIG. 1, an antenna 10 includes a lower plate assembly 12 having a surface 12*a* and a pair of antenna ports 14*a*, 14*b*. In one particular embodiment, each of the antenna ports 14*a*, 14*b* corresponds to a feed port for one of two orthogonal radio frequency (RF) signals (e.g. directed electric fields: Ex, Ey).

The lower plate assembly 12 is provided from a pair of conducting plates 16, 18 which form a pair of parallel plate waveguide transmission paths as will be described below in conjunction with FIGS. 7–9. A member 20 projecting from the surface 12*a* of the lower plate assembly 12 has provided therein a waveguide transition circuit. In one embodiment, the waveguide transition circuit is provided as a ninety-degree bend as will be described below in conjunction with FIG. 9. Suffice it here to say that the waveguide transition circuit couples signals from the waveguide transmission paths formed in plates 16, 18 through the member 20 and into waveguide transmission paths which lead to waveguide apertures 22*a*, 24*a* provided in the member 20. Thus, signals fed into ports 14*a*, 14*b* produce a feed signal which propagates through a transmission path provided in the plates 16, 18 and through a transition circuit in member 20 and is emitted through apertures 22, 24 into an excitation region 25 of the lower assembly 12. The so-provided feed signal provides a uniform excitation in the feed region 25.

An upper plate assembly 26 has a radiating layer 28 with a plurality of radiating elements, generally denoted 30, disposed thereon. The radiating elements 30 may be provided as the types as described in U.S. Pat. Nos. 5,483,248 and 5,995,055 both of which are assigned to the assignee of the present invention and both of which are incorporated herein by reference in their entireties. The upper plate assembly 26 includes a transmission path 31 which accepts the feed signal propagating from the waveguide apertures 22, 24 in the lower plate assembly 12.

The transmission path 31 is here provided from a pair of waveguide transmission lines 32, 33. In one embodiment, the waveguide transmission lines 32, 33 are provided from a pair of conductive plates which form parallel plate waveguides. When the upper plate assembly 26 is disposed on the surface 12*a* of the lower plate assembly 12, the apertures 32, 33 align with the apertures 22*a*, 24*a* provided in the member 20.

The position of the upper plate assembly 26 relative to the lower plate assembly 12 determines the scan angle of a main antenna beam 31 in an elevation plane (i.e. the angle θ) as shown in the Cartesian coordinate system of FIG. 1). Thus, rotation of the upper plate assembly 26 relative to the lower plate assembly 12 (e.g. clockwise or counter clockwise rotation of the upper plate assembly 26 in the x-y plane of the Cartesian coordinate system of FIG. 1), scans the antenna beam 31 in the elevation plane. It should be noted that the position of the antenna beam 31 does not change in response to a change in the operating frequency of the antenna 10.

A rotation of both plate assemblies 12, 26 (i.e. rotation in the x-y plane of the Cartesian coordinate system of FIG. 1) results in the movement of the antenna beam in the azimuth direction (i.e. θ direction as shown in the coordinate system of FIG. 1). Since the elevation and azimuth beam directions are orthogonal, the antenna can scan a conical volume. In one particular embodiment, the antenna 10 scans a conical volume of about fifty degrees.

The parallel plate waveguide transmission lines formed in the upper plate assembly 26 appear as relatively wide waveguides and thus it is possible to excite a quasi-transverse electromagnetic (TEM) feed field, which is a relatively low loss field. Ideally it is desirable to excite the entire circular aperture of the antenna 10 since if the entire circular aperture is excited, it will be possible to achieve a far field radiation pattern having a main beam and a series of side lobes beams with a first side lobe level approximately 17 decibels (db) below the main beam. Because of the quasi-TEM characteristic of the feed signal, nearly all of the radiating elements 30 are excited.

The scan mechanism uses no active components and thus antenna 10 is a relatively low cost antenna. Furthermore, the antenna can be provided as a relatively compact antenna having a relatively low profile. In one embodiment, the distance from a bottom surface of the lower plate assembly 12 to the surface of the radiating later 30 on which the radiating antenna elements 28 are disposed is approximately 3 inches.

When antenna 10 is provided as part of a communication system, the antenna waveguide ports 14*a,* 14*b* may be coupled to one or more multiplexers or two one or more receiver circuits or to one or more transmitter circuits. In one embodiment, a first one of the antenna ports 14*a,* 14*b* is coupled to a receiver circuit and a second one of the antenna ports 14*a,* 14*b* is coupled to a transmitter circuit. In this manner the antenna 10 can provide simultaneous transmit and receive scanned beams (i.e. the antenna 10 can be provided as a full duplex antenna).

In one application, the antenna 10 can act as a ground terminal antenna for Internet communications with break-before-make hand-off requirements. In such an application, it may be desirable to utilize two such antennas 10, each having a full duplex operating characteristic such that each antenna provides full duplex signal beam capability to a satellite terminal. A first one of the antennas communicates, with the satellite and a second one of the antennas is coupled to other ground terminals via similar Internet connections. Since each antenna can simultaneously transmit and receive at different frequencies, signals move in opposite directions at the same time.

Since the scan angle of the antenna is frequency independent, the antenna can operate in a satellite or other communication system over a relatively wide range of frequencies. In one embodiment the antenna is provided having a 55% operating bandwidth.

By providing the transmission paths between the antenna ports 14*a,* 14*b* and the radiator elements 30 from the parallel plate waveguides and by utilizing relatively low loss transition and coupler circuits, the antenna 10 is provided having relatively low transmission and scattering losses. Also, the active aperture of the antenna is circular and is fully utilized in the area available. By providing the antenna as a low-loss antenna and efficiently utilizing the available antenna aperture, a communication system utilizing the antenna can use a single transmit and receive amplifier and thus avoids the complexity and costs associated with an ESA antennas.

It should be understood that each of the antenna ports 14*a,* 14*b* is separately coupled to the radiating elements 30 on the radiating layer. Thus dual polarizations can be fed and separately coupled.

For example, a first signal having a first polarization, e.g. a signal $E_x$ having an x-directed electric field, can be provided to port 14*a*. Likewise, a second signal having a second polarization, e.g. a signal $E_y$ having a y-directed electric field, can be provided to port 14*b*. The first and second signals are treated separately in the antenna 10 from the ports 14*a,* 14*b* all the way to the aperture 28. Thus, it is possible to combine the first and second signals (e.g. at ports 14*a,* 14*b*). In the case where the first and second signals are orthogonally directed signals (e.g. $E_x$, $E_y$) the signals can be combined to provide a signal having any polarization including circular polarization.

Figure 2:
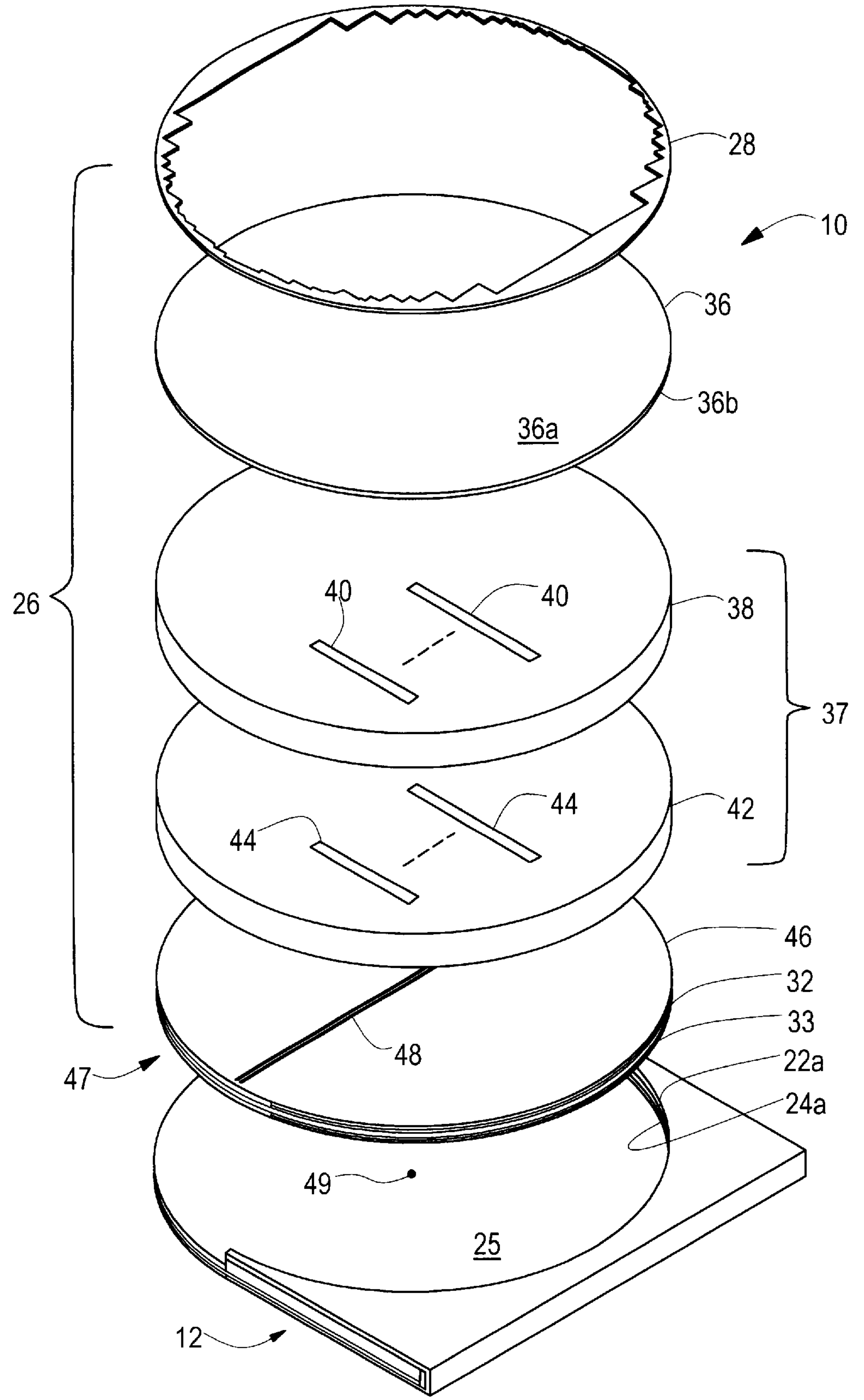
FIG. 2 is an exploded perspective view of the mechanically steerable frequency independent array antenna of FIG. 1.

Referring now to FIG. 2, in which like elements of the antenna system 10 of FIG. 1 are provided having like reference designations, the upper assembly 26 includes the radiator layer 28 (radiators 30 have here been omitted for clarity). The radiator layer 28 may be provided, for example, from a dielectric substrate having a first surface on which a plurality of radiating elements 30 are embedded or otherwise disposed thereon or provided therein. In one embodiment, to be described below in conjunction with FIG. 5A, the radiator layer 28 is provided from a foam layer (e.g. an open or closed cell foam) having a Kapton layer disposed thereover. The radiators 30 are then disposed on the Kapton layer.

In one particular embodiment, the radiators 30 are provided as conductive blocks bonded or otherwise coupled to the radiator layer 28. The conductive blocks may be provided by a machining process or by proving the radiators 30 on the dielectric radiator layer 28 via an additive process such as a metal deposition technique or via a subtractive process such as a patterning process or a subtractive etching process.

The radiator layer 28 is disposed over a first surface of ground plane layer 36. The ground pane layer 36 is provided having first and second opposing conductive surfaces 36*a,* 36*b*. The ground plane layer 36 may be provided for example, from a conductive plate or from a dielectric member having metalized surfaces 36*a,* 36*b*. The ground plane layer is disposed over an upper feed circuit 37 which in turn is disposed over a first surface of a rotating line coupler circuit 46 having a line feed 48 provided therein. The upper feed circuit 37 in combination with the line feed 48 provided in the rotating line coupler circuit 46 provides feed signals to the radiating elements 30 on the radiating layer 28.

In this particular embodiment, the upper feed circuit 37 is provided from a pair of column beamformer layers 38, 42. The layers 38, 42 each couple feed signals of a predetermined polarization from the line feed 48 and provide the feed signals to the radiators 30. In this manner, RF signals having different polarizations can be fed and separately coupled to the radiating elements 30. Thus, the antenna 10 can be responsive to signals of a predetermined different polarization.

As shown in FIG. 2, the layers 38, 42 each couple feed signals from the line feed 48 and provide the feed signals to the radiators through individual columns 40, 44 provided in each of the layers 38, 42 respectively. Thus, each of the layers 38, 42 are provided having a plurality of individual columns 40, 44 respectively which provide feed signals to predetermined ones of the radiating elements 28 on the feed layer 34. Only some of the columns 40, 44 are here shown, the remaining ones being omitted for clarity. As will be described below in conjunction with FIGS. 3–5A, the layers 38, 42 may be provided from a conductive material which form a binomial feed circuit. Alternatively, the layers may be provided as metalized dielectric layers (e.g. metalized plastic layers).

Although the upper feed circuit 37 is here shown provided from a pair of layers 38, 40, it should be appreciated that in some embodiments, it may be desirable to provide the feed circuit 37 from a single layer rather than from multiple layers. Alternatively still, in some applications it may be desirable or necessary to provide the upper feed circuit 37 from more than two layers. The feed circuit can be provided having any number of layers as long as the feed circuit 37 is capable of coupling a feed signal from the rotating line coupler assembly 46 to the radiating elements 28 on the feed layer 34.

Importantly, the rotating line coupler assembly 46 is movable with respect to the lower feed assembly 12. An alignment mechanism 49, here shown as a pin or other member projecting from the surface 12*a* and of the region 25 of the lower plate assembly 12, aligns the rotating line coupler assembly 46 with the lower feed assembly. In one embodiment, the layers 28, 36, 38, 42 and 46 are combined to provide the upper plate assembly 26 which is rotatably disposed in the feed region 25 of the lower plate assembly 12.

It should be appreciated that the antenna of the present invention thus utilizes a relatively simple, line-source to parallel plate waveguide coupling mechanism to a single slot which in turn feeds a corporate feed having equal path lengths which provides a feed signal to each antenna element. Also, the antenna utilizes a true time-delay coupling mechanism so that when the operating frequency of the antenna changes, the antenna beam position stays the same. That is, the antenna beam 31 (FIG. 1) is at the same spatial location at all antenna operating frequencies for a given mechanical scan position.

With the approach described in conjunction with FIGS. 1 and 2, a linear phase distribution can be established along the rows of radiating elements and the upper assembly column beamformers provide an equi-phase distribution. The equal path length (described below in conjunction with FIG. 5) results in an antenna having a relatively wide bandwidth.

Figure 3:
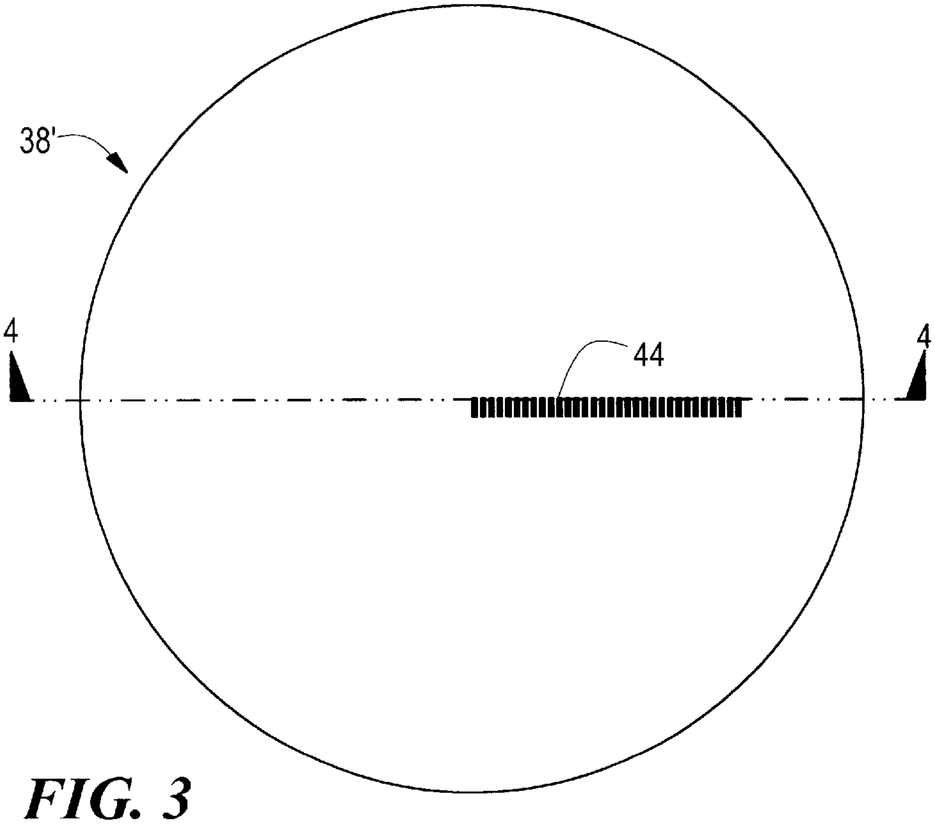
FIG. 3 is a top view of a beamformer layer.
Figure 4:
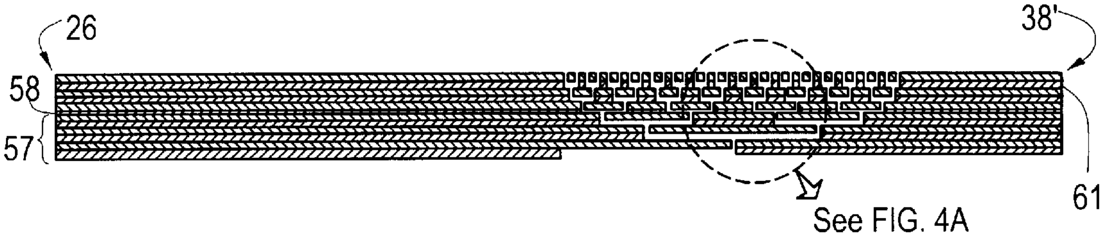
FIG. 4 is a cross-sectional view of the beamformer layer of FIG. 3 taken across line 4—4 of FIG. 3.
Figure 4A:
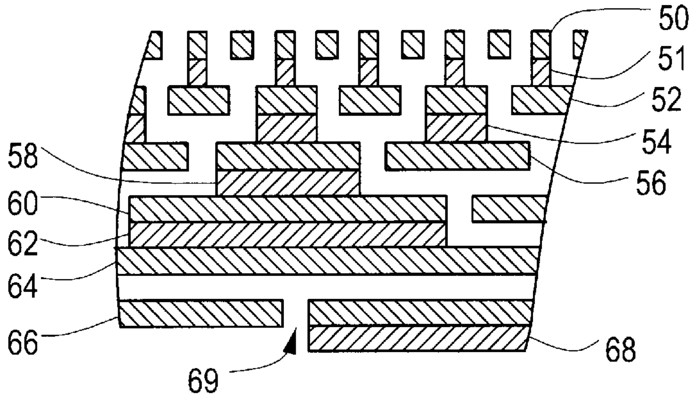
FIG. 4A is a detail of a portion of the beamformer layer of FIGS. 3 and 4 taken across line 5—5 of FIG. 4.

Referring now to FIGS. 3–4A, in which like elements of FIGS. 1 and 2 are provided having like reference designations, a beamforming layer 38' which may be of the type described above in conjunction with FIG. 2 includes a plurality of conductive layers. Here twelve conductive layers, 50–68 in which channels or openings 69 are formed or otherwise provided to form a beamforming circuit. Feed signals propagate through the channels 69 to the radiating elements 28 (FIG. 1). Although twelve conductive layers, 50–68 are here shown, those of ordinary skill in the art will appreciate that fewer or more than twelve layers can be used. The particular number of layers to use in any particular application is selected in accordance with a variety of factors including but not limited to the size, shape and number of radiating elements in the antenna. Other factors to consider include the cost and complexity of the manufacturing techniques which can be used to provide the beamforming layers 38 and 42.

The layers 50–68 may be from a conductive material (e.g. a metal such as copper or other appropriate conductive material) which would be appropriate for forming conductive walls of a transmission line (e.g. a channel such as channel 69) through which RF signals can propagate with relatively low transmission losses. Alternatively, the layers 50–68 may be from a non-conductive material (e.g. a dielectric material such as PTFE or a plastic or a structural foam) having channels 69 formed therein which are then metalized using an appropriate conductive material which would be appropriate for providing conductive walls of the signal paths 69 such that RF signals can propagate therethrough with relatively low transmission losses.

In one particular embodiment, provided in the layers 50–68 are column couplers, column beam formers and unit cell couplers. The column couplers provide a transition into the column beam formers. The column beam formers provide a true time delay, equal phase distribution having a cos (Pd/4) amplitude distribution. The unit cell couplers are provided as vertical launches and provide a transition into the unit cell radiators 30. The radiators 30 are provided as dual orthogonal CTS radiators and form a phased array interface to free space.

Figure 5:
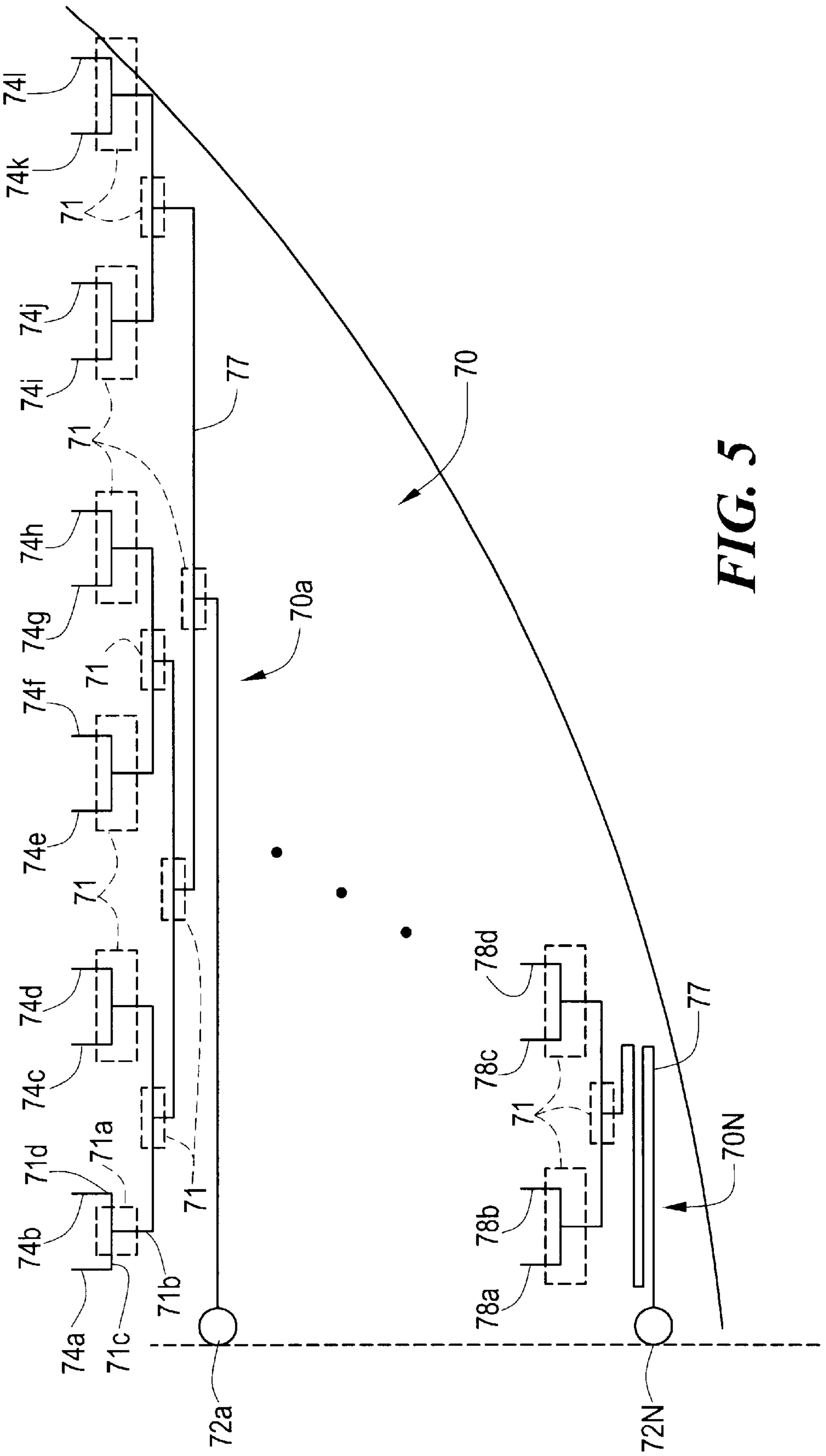
FIG. 5 is a schematic diagram of a corporate feed structure of a type which may be used in the antenna of FIG. 1.

Referring now to FIG. 5, a corporate feed structure 70 provided from a plurality of corporate feed circuits 70*a*–70N are disposed in each quadrant of the antenna 10 only one antenna quadrant being shown on FIG. 5. Corporate feed structure 70 may be the type provided in the beamforming layers discussed above in conjunction with FIGS. 3–4A. Each of the corporate feed circuits 70*a*–70N are fed from a corresponding one of a plurality of feed points 72*a*–72N. Each of the corporate feed circuits 70 are provided from a plurality of power divider circuits generally denoted 71. Taking power divider circuit 71*a* as representative as all of the power divider circuits 71, in response to a signal fed to port 71*b*, the circuit 71 provides equal phase, equal amplitude signals at ports 71*c*, 71*d*.

Phase lines 77 are appropriately inserted into the corporate feed circuit 70 such that in response to a signal provided to feed point 72*a*, corporate feed circuit 70*a* provides equal phase, equal amplitude signals at ports 74*a*–741. Such signals are then coupled in a unit cell couplers to respective ones of to the radiating elements 30 (FIG. 1). Thus, corporate feed circuit 70N provides equal amplitude, equal phase signals at ports 78*a*–78d to radiating elements 30 as shown. It should be noted that the corporate feeds 70 includes a relatively long path length 77 which keeps the phase at the ports 78*a*–78*d* equal to the phase at the ports 74*a*–74l.

Figure 5A:
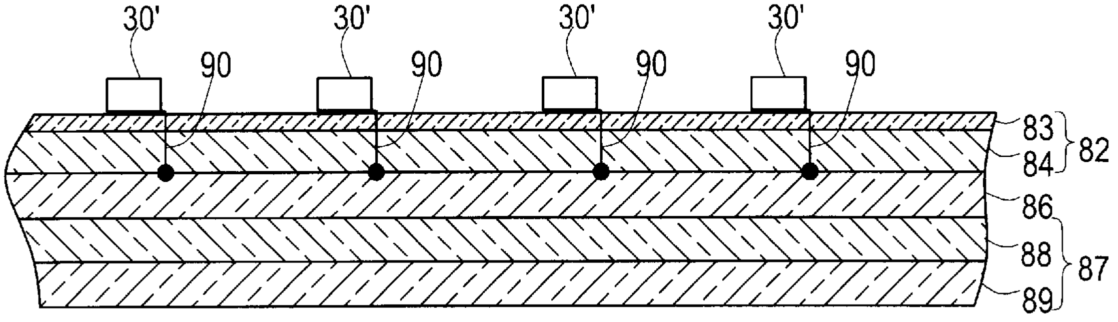
FIG. 5A is a schematic cross-sectional view of a mechanically steerable frequency independent array antenna.

Referring now to FIG. 5A, a portion of an antenna 10' which may be similar to the antenna 10 described above in conjunction with FIGS. 1–5 includes a plurality of radiating elements 30' provided as part of a radiating layer 82. Radiating layer 82 is provided from a pair of dielectric layers 83, 84.

In one embodiment, the dielectric layer 83 is provided as a Kapton layer having conductive blocks 30' bonded thereto. The conductive blocks may be provided by a machining process or by providing the radiators on the dielectric via an additive process (e.g. metal deposition) or via a subtractive process (e.g. a patterning process or a subtractive etching process). The layer 84 is provided from a foam material such as an open cell foam, a closed cell foam or a structural foam.

The radiator layer 82 is disposed over a ground plane layer 86 which in turn is disposed over a column beamformer layer 87. A plurality of line couplers 90 couple energy between the column beamformer circuits provided in layers 88, 89 through the ground plane layer (e.g. through openings provided in the ground plane layer 86) and the radiators 30'.

Figure 6:
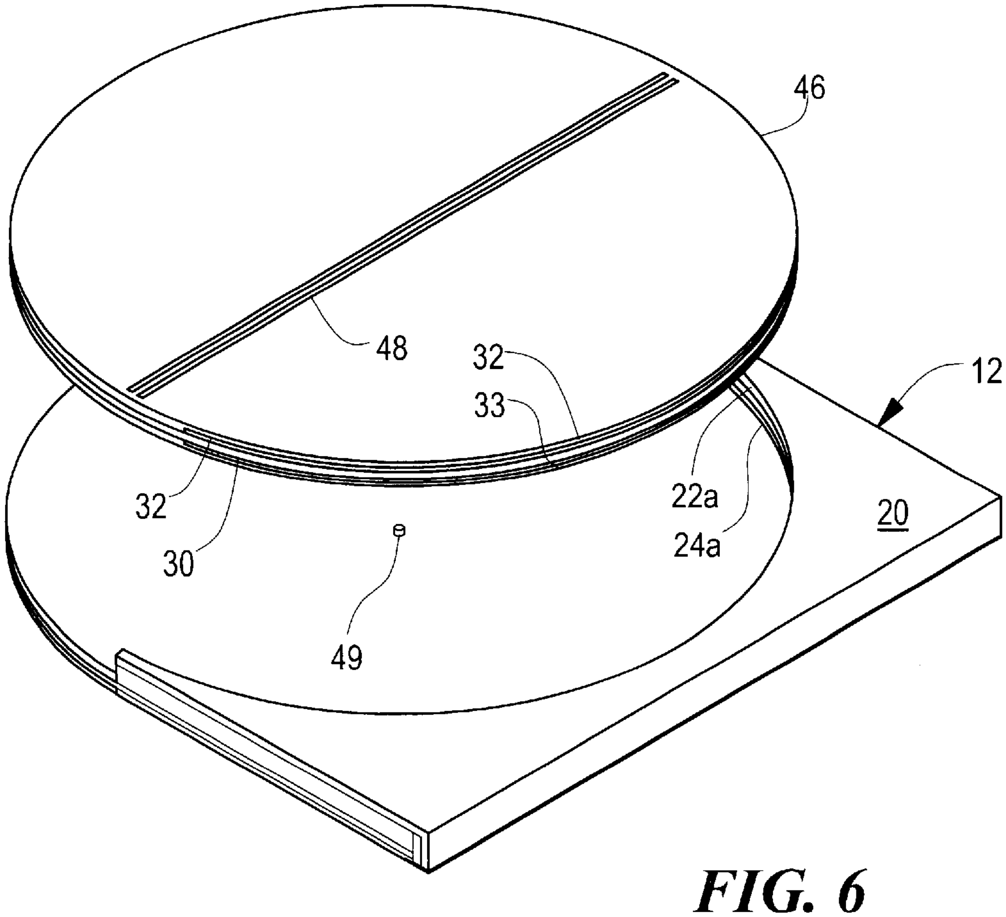
FIG. 6 is an exploded perspective view of a lower plate assembly and a line coupler assembly.
Figure 6A:
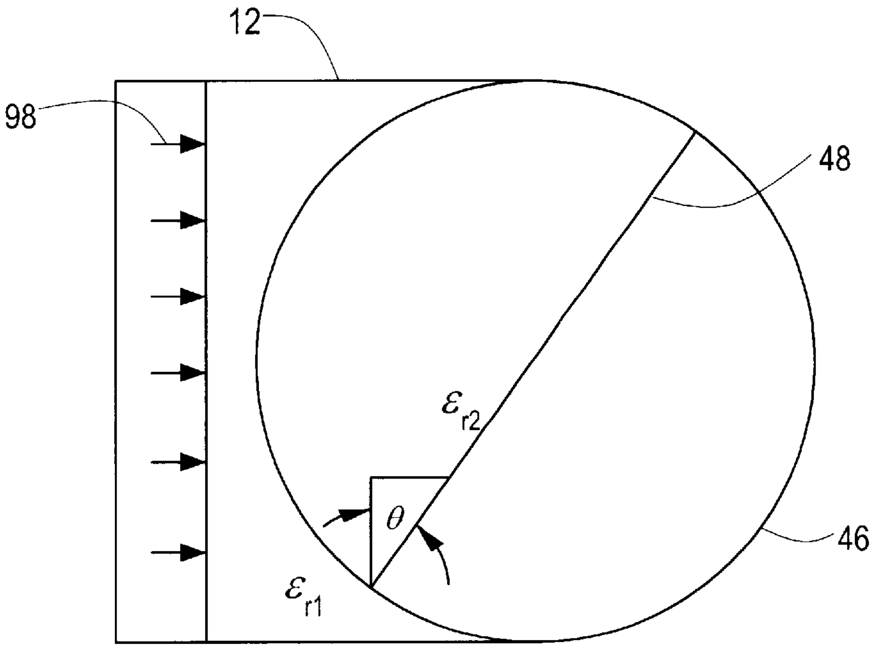
FIG. 6A is a top view of a lower plate assembly having a line coupler assembly disposed thereon.

Referring now to FIGS. 6 and 6A in which like elements of FIGS. 1–4A are provided having like reference designations, the lower plate assembly 12 is shown having the rotating line coupler assembly 46 provided from parallel plate waveguides disposed thereover. A signal fed to one of ports 14*a*, 14*b* (FIG. 1) is coupled through the lower plate assembly 12 to the long line array feed line 48.

As described above in conjunction with FIGS. 1–4A, a signal fed to one of the antenna ports 14*a*, 14*b* is coupled through the parallel plate waveguide and the transition circuit and is provided to the rotating line coupler assembly 46 as a feed signal having a uniform phase front 98. The angle of the feed signal provided by the line coupler feed 48 may be computed as shown in Equation 1:

$$\sin\theta=\text{sqrt}(\in_r)\sin\theta' \quad \text{Equation 1}$$

in which:

θ corresponds to the antenna elevation scan angle;

$\in_{r1}$ corresponds to the relative dielectric constant of the transmission media in the lower plate assembly 12;

$\in_{r2}$ corresponds to the relative dielectric constant of the transmission media in the line coupler assembly 46; and θ' corresponds to the angle of the line coupler 48 with respect to the in-phase feed signal 98.

Thus, the rotating line coupler assembly 46 introduces a scanning true time delay linear phase distribution, which thus results in the antenna beam being steered in a particular direction.

In one embodiment the lower plate assembly 12 includes a corporate feed circuit which provides the uniform feed signal to the line coupler 48. In a preferred embodiment to be described below in conjunction with FIG. 10, the lower assembly 12 corresponds to a one-dimensional beamformer provided from a so-called pillbox feed (TBR).

After the rotating line coupler assembly 46 is disposed over the lower plate assembly 12, the assembly 46 is movable with respect to the lower plate assembly 12. In particular, the angle at which the line coupler 48 intercepts the feed signal from the lower assembly 12 can be changed. Furthermore, the angle at which the line coupler 48 intercepts the feed signal from the lower plate assembly determines the scan angle of the antenna beam 31 (FIG. 1) in the elevation direction.

In one embodiment, a ring bearing is utilized to facilitate rotation of the assembly 46 relative to the plate assembly 12 to thereby change the angle at which the line coupler 48 intercepts feed signals provided by the lower assembly 12. In an embodiment where assembly 46 rotates with respect to lower plate assembly 12, the alignment pin 49 can act as an axis of rotation.

The antenna waveguide ports 14*a,* 14*b* which provide the antenna RF interface can be provided, for example as rigid waveguide.

Figure 6B:
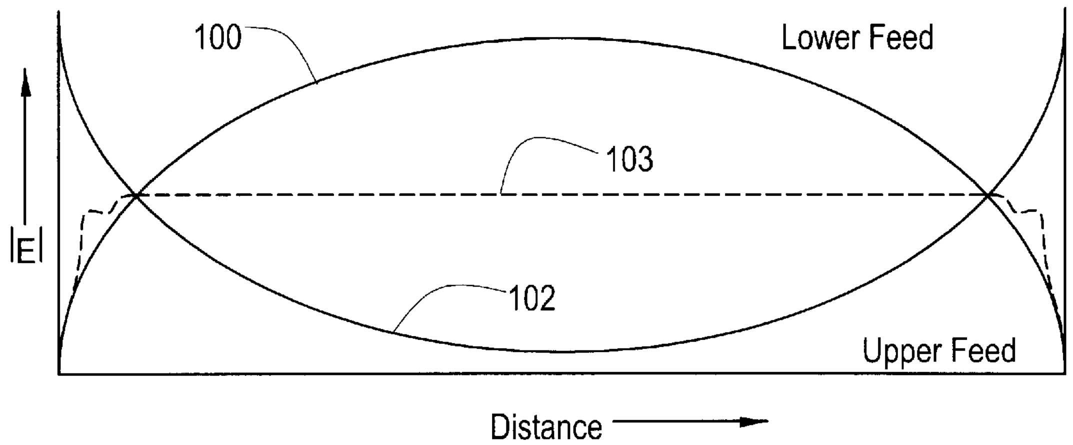
FIG. 6B is a plot of electric field amplitude distribution of the lower plate assembly and line coupler assembly of FIG. 6A vs. distance across the lower plate assembly and the line coupler assembly.

Referring now to FIG. 6B, a plot of electric field amplitude vs. distance is shown. Curve 100 corresponds to the amplitude distribution provided by a lower feed assembly (e.g. lower feed assembly 12 described above in conjunction with FIG. 1) while the curve 102 corresponds to the amplitude distribution provided by an upper feed assembly (e.g. upper feed assembly 26 described above in conjunction with FIG. 1). Ideally, the combination of the amplitude distributions 100, 102 correspond to a straight line 103. It should be noted that it is possible to change either amplitude taper 100, 102 provided by either the upper or lower plate assemblies to control the amplitude distribution of the antenna.

Figure 7:
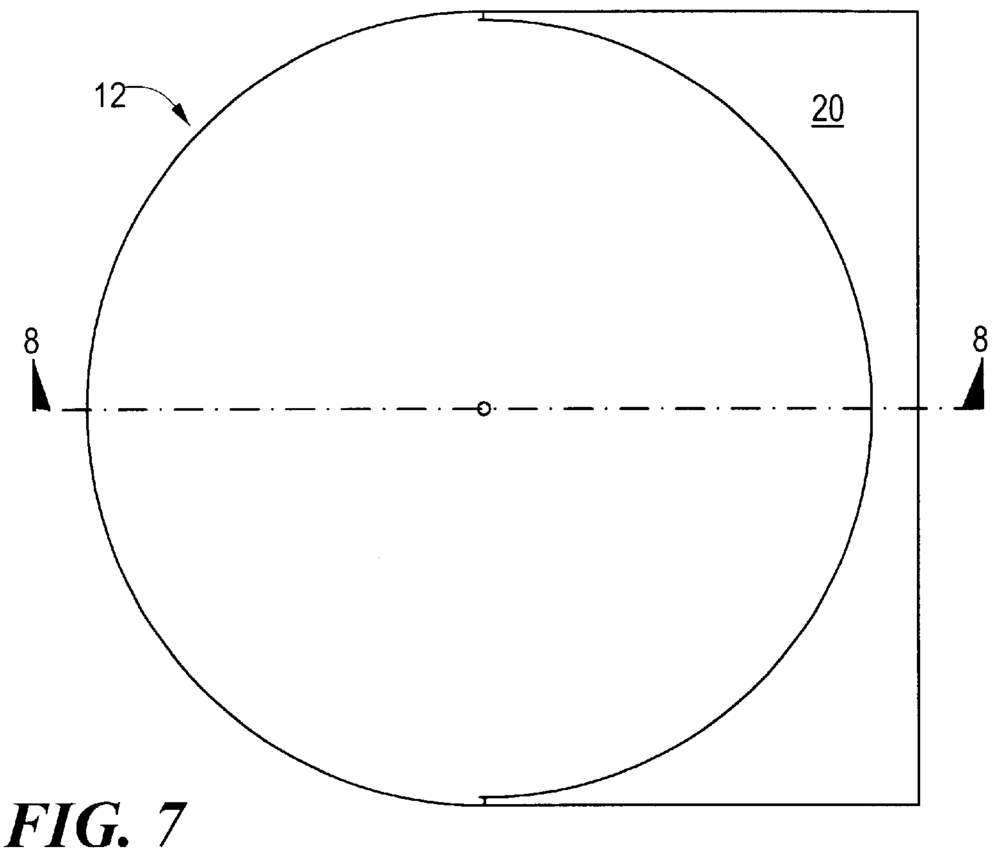
FIG. 7 is a top view of a lower plate assembly.
Figure 8:
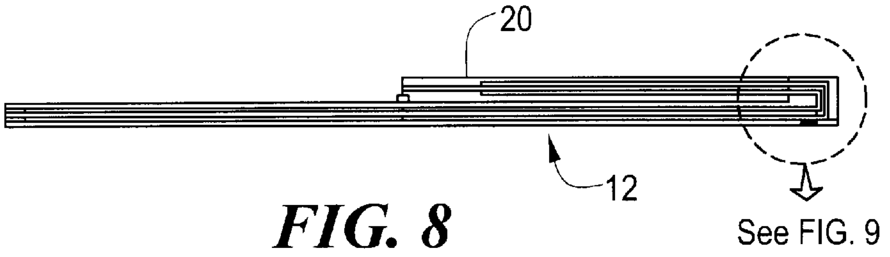
FIG. 8 is a cross-sectional view of a lower plate assembly taken across lines 8—8 of FIG. 7.
Figure 9:
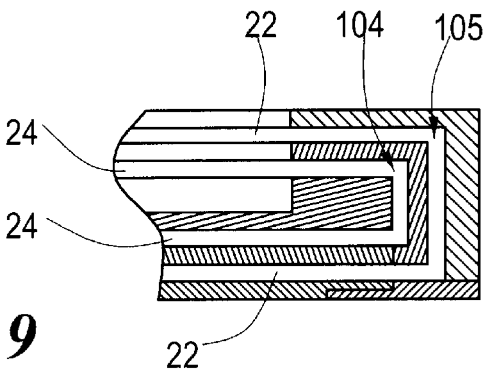
FIG. 9 is a detail view of a lower plate assembly taken across lines 9—9 of FIG. 8.

Referring now to FIGS. 7–9 in which like elements of FIGS. 1 and 2 are provided having like reference designations, the lower plate assembly 12 includes a pair of parallel plate waveguides which form waveguide transmission lines 22, 24 through which propagates an ideally uniform TEM field. As can be seen in FIGS. 8 and 9 the waveguides feed two ninety-degree bends 104, 105 in the parallel plate waveguide which change the TEM field direction and physical level. The resulting signal provided from the lower plate assembly propagates an ideally uniform TEM field to the upper plate assembly 26 (not shown in FIGS. 7–9) for coupling to the radiating elements as described above.

It should be appreciated that although lower plate assembly 12 is here provided from two parallel plate waveguides, in some applications it may be desirable or necessary to use only one parallel plate waveguide in which case the antenna would be provided having only a singly one of the antenna ports 14*a,* 14*b.* Alternatively still, in some applications it may be desirable or necessary to provide lower plate assembly from more than two parallel plate waveguides. In this case each waveguide transmission line can be provided having its own port.

It should be understood that in the cases where the lower plate assembly 12 is provided having fewer or more than two parallel plate waveguides, the upper plate assembly 26 must be correspondingly modified to accept the signals provided from the lower plate assembly 12.

Figure 10:
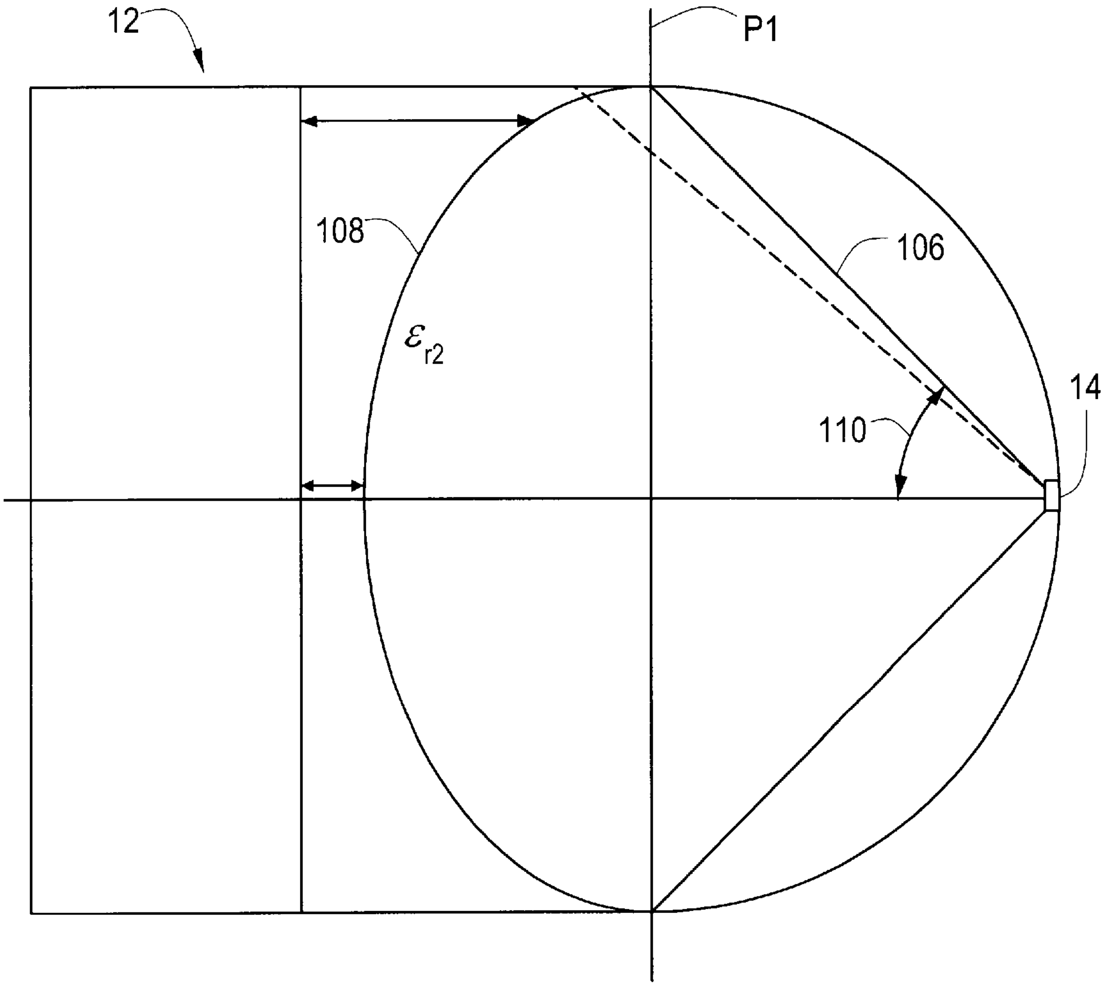
FIG. 10 is a diagrammatic view of a pillbox feed circuit.

Referring now to FIG. 10, the lower plate assembly 12 is provided having a one-dimensional beamformer provided from a pillbox feed in which the angle 110 of the waveguide feed 14 controls the amplitude taper introduced at plane P1. In one embodiment, the pillbox feed illuminates the parallel plate of lower plate assembly 12 with the TEM field having a $\cos^{-1}$ (Pd/4) amplitude distribution. The pillbox feed provides signal through the two ninety degree bends 104, 105 (FIG. 9) in the parallel plate waveguide which changes the TEM field direction and level. The field is then fed through a second parallel plate waveguide transmission line provided in line coupler plate assembly 46 to the line coupler 48.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. An antenna comprising:

a lower plate assembly having at least one antenna port, said lower plate assembly for providing a feed signal on a first surface of said lower plate assembly in response to an input signal fed provided to the at least one antenna port; and an upper plate assembly having a feed circuit coupled to a plurality of radiating elements which define a radiating aperture, said upper plate assembly rotatably disposed on the first surface of said lower plate assembly such that said feed circuit couples energy between said lower plate assembly and said plurality of radiating elements and a position of said feed circuit on the said upper plate assembly relative to said lower plate assembly determines a scan angle of the antenna.

2. The antenna of claim 1 wherein said upper plate assembly comprises:

a rotating line coupler disposed to couple RF energy propagating on the first surface of said lower plate assembly;

a column coupler disposed to couple RF energy from said rotating line coupler;

a column beamformer circuit disposed to couple RF energy from said column coupler;

an element coupler disposed to couple RF energy between said column beamformer circuit and said plurality of radiating antenna elements and wherein the position of said rotating line coupler relative to said lower plate assembly determines a scan angle of the antenna.

3. The antenna of claim 1 wherein said lower plate assembly comprises:

at least one parallel plate waveguide transmission line having a first portion coupled to the antenna port and a having a second portion; and a transition circuit having a first portion coupled to the second portion of said parallel plate waveguide transmission line and a second portion coupled to said upper plate assembly.

4. The antenna of claim 3 wherein said transition circuit comprises a waveguide transmission line having at least one ninety degree bend.

5. The antenna of claim 1 wherein said lower plate assembly is provided having first and second antenna ports, and said a lower plate assembly further comprises a beamformer provided from a pair of parallel plate waveguides with each of the antenna ports, separately coupled to a predetermined one of the parallel plate waveguides and wherein said beamformer is adapted to couple energy between the first and second antenna ports and said plurality of radiating elements.

6. An antenna comprising:

a lower plate assembly having a feed region;

a line coupler assembly including a line coupler, said line coupler assembly movably disposed in the feed region of said lower plate assembly to couple signals between the feed region of said lower plate assembly and the line coupler;

a feed circuit, disposed over said line coupler assembly to couple signals between said line coupler and a plurality of radiating element feed ports provided in said feed circuit; and a radiating layer having a plurality of radiating elements, said radiating layer disposed over said feed circuit such that the radiating element feed ports provided in said feed circuit are electrically coupled to corresponding ones of the plurality of radiating elements.

7. The antenna of claim 6 wherein a spatial position of an the antenna beam provided by the antenna is determined by a relative position of the line coupler in the feed region.

8. The antenna of claim 6 wherein said feed circuit comprises a corporate feed structure.

9. The antenna of claim 6 wherein said lower plate assembly comprises a pillbox feed circuit.

10. The antenna of claim 6 wherein said lower plate assembly comprises a corporate feed circuit.

11. The antenna of claim 6 wherein said line coupler assembly comprises a pair of line couplers, each of said line couplers movably disposed in the feed region of said lower plate assembly to couple signals in the feed region of said lower plate assembly.

* * * * *

UNITED STATES PATENT AND TRADEMARK OFFICE

CERTIFICATE OF CORRECTION

PATENT NO. : 6,507,319 B2 Page 1 of 1
DATED : January 14, 2003
INVENTOR(S) : Thomas V. Sikina It is certified that error appears in the above-identified patent and that said Letters Patent is hereby corrected as shown below:

Column 1,
Line 60, delete "ESA anteinas" and replace with -- ESA antennas --.

Column 2,
Line 16, delete "based plant form" and replace with -- based platform --.

Column 3,
Lines 26-28, delete all lines as they repeat previous paragraph.
Line 57, delete "lines 8-8" and replace with -- line 8-8 --.
Line 59, delete "lines 9-9" and replace with -- line 9-9 --.

Column 4,
Line 3, delete "fields: Ex, Ey)." and replace with -- fields Ex, Ey). --.
Line 44, delete "the angle $\theta$ )" and replace with -- the angle $\theta$ --.

Column 5,
Line 3, delete "of side lobes beams" and replace with -- of side lobe beams --.
Line 12, delete "radiating later 30" and replace with -- radiating layer 30 --.
Line 17, delete "two one or more" and replace with -- to one or more --.
Line 53, delete "an ESA antennas." and replace with -- an ESA antenna. --.

Column 6,
Line 24, delete "The ground pane layer" and replace with -- The ground plane layer --.

Signed and Sealed this

Twelfth Day of August, 2003

JAMES E. ROGAN
*Director of the United States Patent and Trademark Office*